United States Patent
Tanaka

(10) Patent No.: US 8,282,219 B2
(45) Date of Patent: Oct. 9, 2012

(54) PROJECTOR AND CONTROL METHOD

(75) Inventor: Hiroyuki Tanaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 354 days.

(21) Appl. No.: 12/686,687

(22) Filed: Jan. 13, 2010

(65) Prior Publication Data

US 2010/0177283 A1 Jul. 15, 2010

(30) Foreign Application Priority Data

Jan. 13, 2009 (JP) .................................. 2009-004323

(51) Int. Cl.
*G03B 21/14* (2006.01)
(52) U.S. Cl. .......................................... 353/70; 353/69
(58) Field of Classification Search .................... 353/69, 353/70, 46, 51, 101
See application file for complete search history.

(56) References Cited

U.S. PATENT DOCUMENTS

| | | | | |
|---|---|---|---|---|
| 7,213,926 B2 * | 5/2007 | May et al. | ........................ | 353/69 |
| 7,284,866 B2 * | 10/2007 | Buchmann | ....................... | 353/42 |
| 7,290,889 B2 * | 11/2007 | Ullmann | ........................ | 353/122 |
| 7,533,569 B2 * | 5/2009 | Sheynblat | ........................ | 73/510 |
| 7,661,825 B2 * | 2/2010 | Nishida | ............................ | 353/69 |
| 7,690,797 B2 * | 4/2010 | Higashi | ............................ | 353/69 |
| 2009/0079945 A1 * | 3/2009 | Klosowiak et al. | ............. | 353/69 |
| 2012/0002178 A1 * | 1/2012 | Bowen et al. | .................... | 353/69 |

FOREIGN PATENT DOCUMENTS

JP 2005-043570 A 2/2005

* cited by examiner

*Primary Examiner* — William C Dowling
(74) *Attorney, Agent, or Firm* — AdvantEdge Law Group, LLC

(57) ABSTRACT

A projector includes: a projecting portion that projects an image based on input image data; an image data producing portion that produces the image data and then outputs the image data to the projecting portion; an image sensor that captures the projected image and thus produces a captured image; a movement detection sensor that is arranged on a plane parallel to the imaging plane of the image sensor and produces movement information on the basis of the detected movement, the movement detection sensor being arranged at an angle in the direction not equal to the horizontal direction and vertical direction of the imaging plane; a determining portion that determines whether the movement information meets an adjustment condition or not; and a control portion that, when the movement information meets the adjustment condition, controls the image data producing portion so as to adjust the image data on the basis of the captured image.

8 Claims, 5 Drawing Sheets

PROJECTOR AND CONTROL METHOD

The entire disclosure of Japanese Patent Application No. 2009-004323 filed Jan. 13, 2009 is expressly incorporated by reference herein.

BACKGROUND

1. Technical Field

The present invention relates to a projector and a control method.

2. Related Art

After changing the orientation of a projector, a user operates buttons to project and adjust an OSD image in order to correct a distortion (such as a keystone or trapezoidal distortion) of the image. A technique for omitting such button operations has been disclosed in JP-A-2005-43570 describing a projector having one or a plurality of two-axis or three-axis gyroscopes, for example, to be used to detect a movement and minimizing blurs of a displayed image and a projector performing image processing on photographed image information from a CCD to determine the attitude of the projector.

However, JP-A-2005-43570 does not describe an implementation method for a case employing one two-axis or three-axis gyroscope or the like, and the usages with a combination of the configuration and a CCD are also not clear. According to a technique that only uses a CCD to detect the movement of a projector, it is difficult to correctly detect the movement of a projector when the capturing range of the CCD contains a presenter and/or a pointing stick, for example.

For the purpose of image adjustment control such as correction of a trapezoidal distortion, it is not preferable to be excessively sensitive to the movement of a projector. For example, a sensor with high sensitivity or a sensor that only detects vibrations may detect vibrations by a fan and/or a speaker internally contained in a projector, and it is difficult to correctly detect the movement of the projector. The application of a sensor that simultaneously detects in a plurality of directions or a sensor with high sensitivity may unnecessarily increase the manufacturing costs of a projector, compared with the purpose of the adjustment control on images.

SUMMARY

An advantage of some aspects of the invention is to provide a projector and control method that employ an image sensor and a movement detection sensor that detects a movement in at least one direction to perform image adjustment control automatically in accordance with the movement of the projector.

According to an aspect of the invention, there is provided a projector including a projecting portion that projects an image based on input image data, an image data producing portion that produces the image data and then outputs the image data to the projecting portion, an image sensor that captures the projected image and thus produces a captured image, a movement detection sensor that is arranged on a plane parallel to the imaging plane of the image sensor and produces movement information on the basis of the detected movement, the movement detection sensor being arranged at an angle in the direction not equal to the horizontal direction and vertical direction of the imaging plane, a determining portion that determines whether the movement information meets an adjustment condition or not, and a control portion that, when the movement information meets the adjustment condition, controls the image data producing portion so as to adjust the image data on the basis of the captured image.

According to another aspect of the invention, there is provided a control method for a projector having a projecting portion that projects an image based on input image data, an image data producing portion that produces the image data and then outputs the image data to the projecting portion, an image sensor that captures the projected image and thus produces a captured image, and a movement detection sensor that is arranged on a plane parallel to the imaging plane of the image sensor and produces movement information on the basis of the detected movement, the movement detection sensor being arranged at an angle in the direction not equal to the horizontal direction and vertical direction of the imaging plane. The control method includes producing movement information on the projector, determining whether the movement information meets an adjustment condition or not, and, when the movement information meets the adjustment condition, controlling the image data producing portion so as to adjust the image data on the basis of the captured image acquired by capturing a projected image.

According to some aspects of the invention, the projector employs the movement detection sensor that moves integrally with an image sensor to detect the movement of the projector. Thus, when the projector is moved, image adjustment control can be performed automatically. According to some aspects of the invention, the projector determines whether given movement information meets an adjustment condition or not. Thus, slight vibrations occurring in the projector can be ignored, which allows accurate determination on whether the projector has been moved or not.

An imaging plane by the image sensor is arranged in the direction of capturing a projected image. Thus, when the movement detection sensor is arranged on a plane parallel to the imaging plane, the movement that affects the capturing can be correctly detected.

The movement detection sensor is arranged at an angle in the direction that is not equal to the horizontal direction and vertical direction of the imaging plane of the image sensor. This allows detection of a movement in any direction within the plane parallel to the imaging plane of the image sensor.

The control portion may control the image data producing portion so as to adjust the image data in order to correct a distortion of the image on the basis of the captured image when the movement stops after the movement information meets the adjustment condition.

In this case, the projector uses the captured image when the movement stops. Thus, the captured image to be used is free from blurs, and a distortion of the image can be more accurately corrected.

The movement detection sensor may detect the movement information regarding a change or changes in pitch angle and/or yaw angle of the imaging plane of the image sensor.

In this case, the projector can grasp a change or changes that is or are easy to occur in pitch angle and yaw angle. Thus, the projector can correctly determine whether the projector has been moved or not.

The movement detection sensor may be a gyroscope that detects an angular velocity in at least one direction.

Thus, the fact that the projector has been moved can be accurately detected with a simple configuration.

When the movement information meets the adjustment condition, the control portion may control the image data producing portion so as to produce a calibration image data to be output to the projection portion, and control the image sensor so as to capture the calibration image projected by the projecting portion and produce the captured image.

Thus, the projector can automatically perform the processing from the projection of a calibration image to the image adjustment when the projector is moved in a way meeting the adjustment condition.

When the movement information meets the adjustment condition, the control portion may control the projecting portion so as to perform focus adjustment on the projected image on the basis of the captured image.

Thus, the projector can automatically perform focus adjustment when the projector is moved in a way meeting the adjustment condition.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments applying the invention to a projector will be described with reference to drawings below. The following embodiments do not limit details of the claimed invention. Not all of the components of the following embodiments are indispensable to the claimed invention.

First Embodiment

Figure 1:
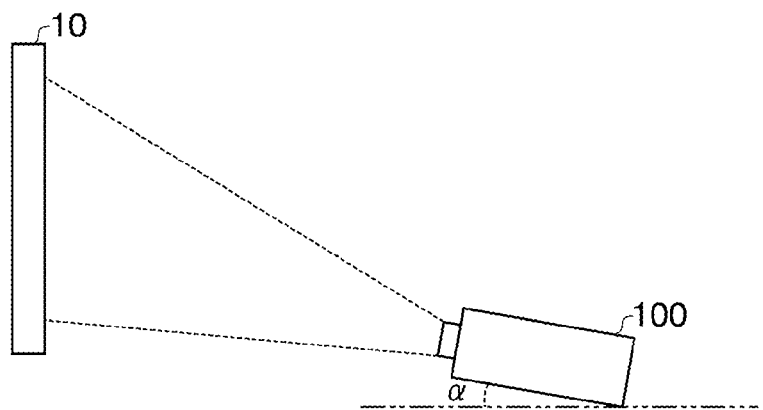
FIG. 1 is an elevation view of a projector that is projecting according to a first embodiment.
Figure 2:
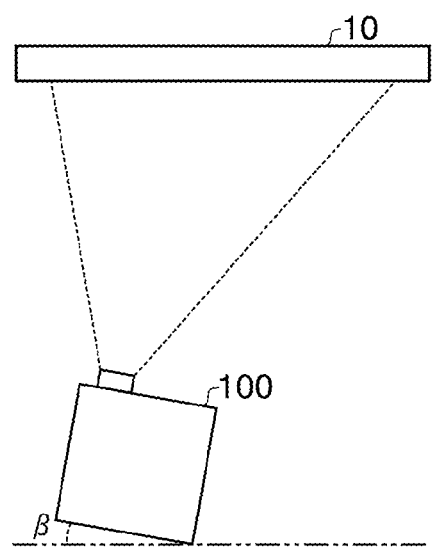
FIG. 2 is a top view of the projector that is projecting according to the first embodiment.
Figure 3:
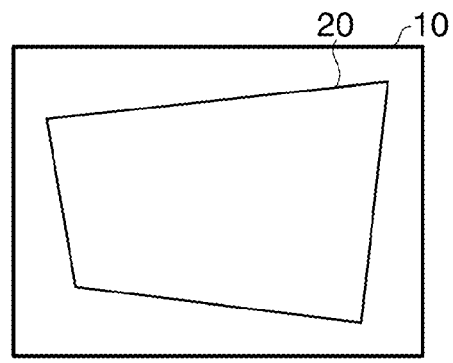
FIG. 3 is a diagram illustrating an example of an image according to the first embodiment.

FIG. 1 is an elevation view of a projector 100 that is projecting according to a first embodiment. FIG. 2 is a top view of the projector 100 that is projecting according to the first embodiment. FIG. 3 is a diagram illustrating an example of an image 20 according to the first embodiment.

The projector 100 tilts upward at an angle $\alpha$ from the horizontal plane and tilts rightward at an angle $\beta$ from the plane parallel to a screen 10. In other words, the pitch angle and yaw angle of the projector 100 are $\alpha$ and $\beta$, respectively.

In this case, the image projected on the screen 10 has a distortion, like the image 20 illustrated in FIG. 3. Also in this case, the projector 100 may be required to correct the distortion of the image 20.

Figure 4:
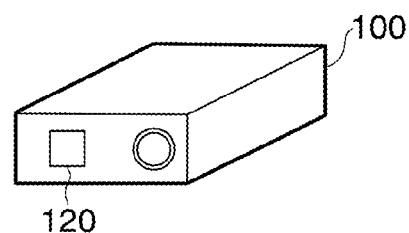
FIG. 4 is an external view of the projector according to the first embodiment.

FIG. 4 is an external view of the projector 100 according to the first embodiment. The projector 100 has a CCD camera 120 in order to correct a distortion of the image 20. The CCD camera 120 that is a type of image sensor captures the image 20 projected on the screen 10 and produces a captured image.

The projector 100 uses the captured image to grasp the distortion of the image 20 and perform distortion correction on the image 20.

According to this embodiment, the projector 100 has a gyroscope that functions as a movement detection sensor that produces movement information on a change or changes in pitch angle and/or yaw angle. Thus, the projector 100 can detect a change or changes in pitch angle and/or yaw angle and automatically perform distortion correction processing on the image 20 when it or they meet an adjustment condition.

Figure 5:
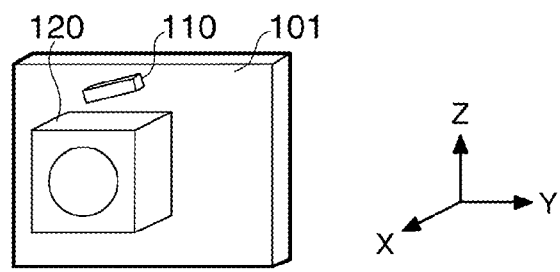
FIG. 5 is an external view of a sub-board according to the first embodiment.
Figure 6:
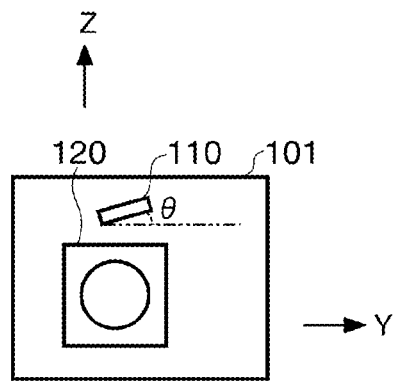
FIG. 6 is a front view of the sub-board according to the first embodiment.

FIG. 5 is an external view of a sub-board 101 according to the first embodiment. FIG. 6 is a front view of the sub-board 101 according to the first embodiment. The projector 100 has the sub-board 101 attached near a projector lens. On the sub-board 101, the CCD camera 120, a gyroscope 110 and so on are mounted.

As illustrated in FIG. 6, the gyroscope 110 tilts by an angle $\theta$ toward the horizontal direction (or Y-direction) of the imaging plane of the CCD camera 120. In other words, the gyroscope 110 moves integrally with the CCD camera 120, is arranged on the sub-board 101 parallel to the imaging plane of the CCD camera 120 and is arranged on the sub-board 101 at an angle (which may be larger than 0 degree and smaller than 90 degrees, such as 45 degrees) in the direction (Z-direction) that is not equal to the horizontal direction and vertical direction of the imaging plane. Under this state, the gyroscope 110 produces movement information (such as information describing an angular velocity).

The projector 100 determines whether the movement information from the gyroscope 110 meets an adjustment condition or not, and if so, the projector 100 automatically performs distortion correction, for example, on the image.

Figure 7:
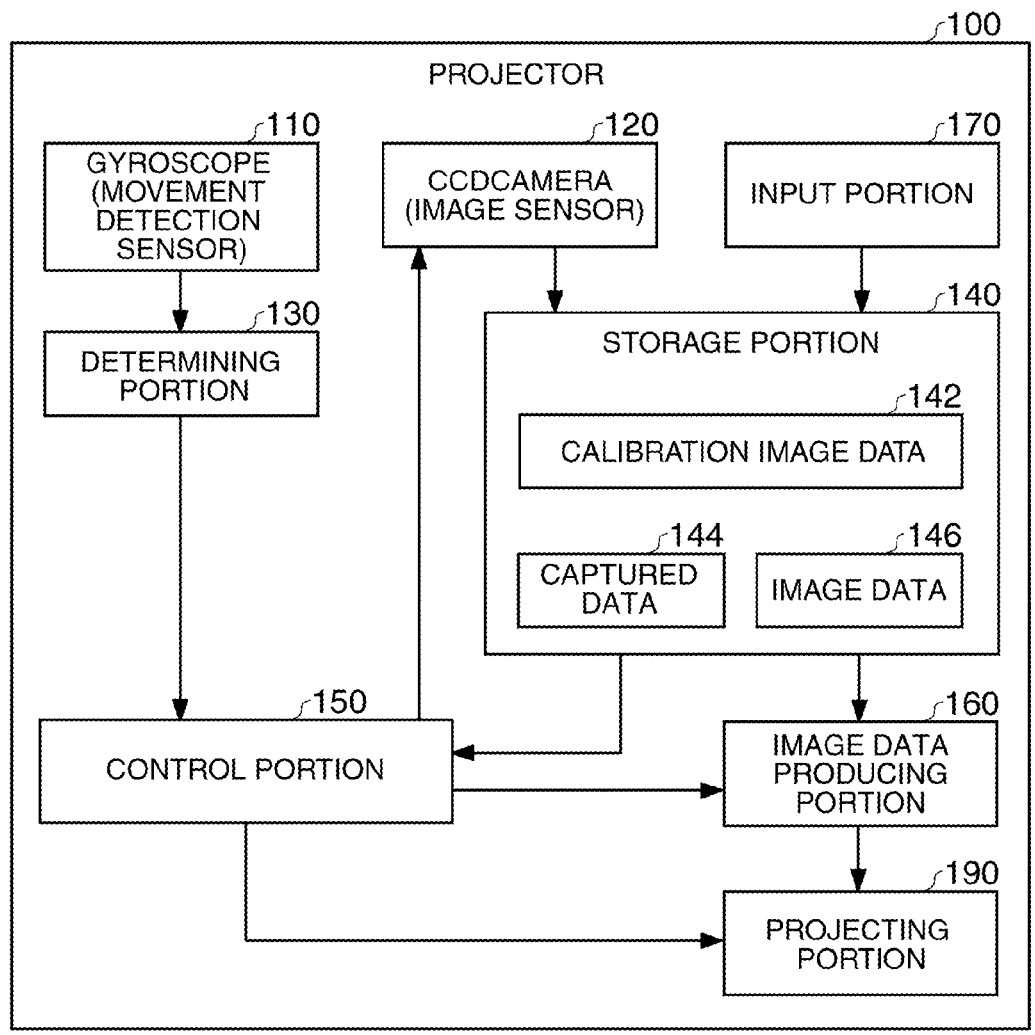
FIG. 7 is a functional block diagram of the projector according to the first embodiment.

Next, there will be described functional blocks of the projector 100 having those functions. FIG. 7 is a functional block diagram of the projector 100 according to the first embodiment.

The projector 100 includes an image data producing portion 160 that produces a calibration image, for example, a projecting portion 190 that projects a calibration image, for example, a CCD camera 120 that captures the projected calibration image and produces a captured image, and the gyroscope 110.

The projector 100 further includes a determining portion 130 that determines whether given movement information meets an adjustment condition or not, a control portion 150 that, when the given movement information meets the adjustment condition, performs image adjustment control on the basis of the captured image, an input portion 170 that receives input of image information, for example, from a PC (or personal computer), for example, and a storage portion 140 that stores calibration image data 142, captured data 144 representing the captured image, and image data 146 representing image information.

Those functions of the projector 100 may be implemented by the following hardware. For example, in the projector 100, the determining portion 130 and control portion 150 may be implemented by a CPU, the storage portion 140 by a RAM, the image data producing portion 160 by an image processing circuit, the input portion 170 by an input terminal, and the projecting portion 190 by a lamp, a liquid crystal panel, a liquid crystal drive circuit and/or a lens, for example.

Figure 8:
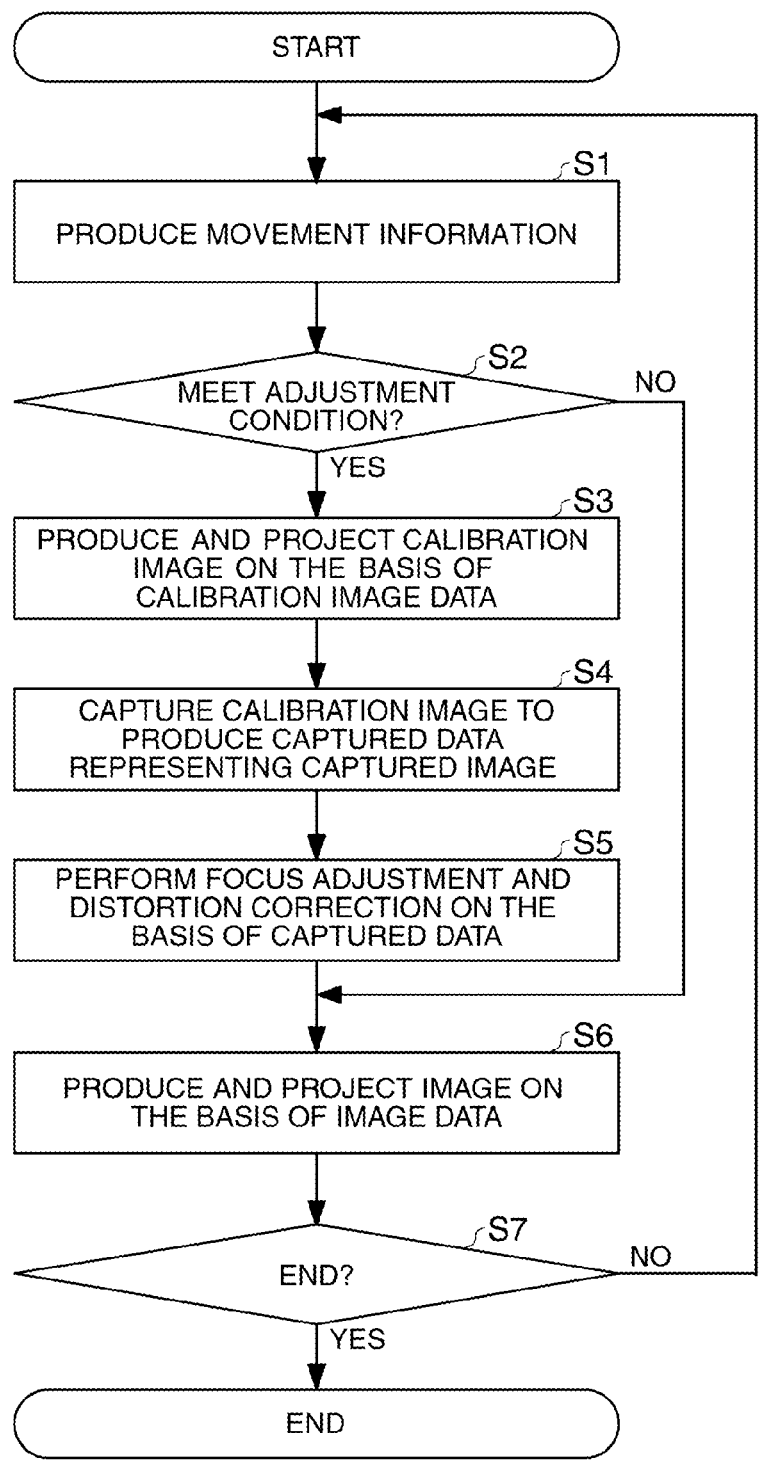
FIG. 8 is a flowchart illustrating a projection routine according to the first embodiment.

Next, there will be described a projection routine on the image 20 in the projector 100 employing the gyroscope 110 and so on. FIG. 8 is a flowchart illustrating a projection routine according to the first embodiment.

A user may arrange the projector 100 at a desirable position and at a desirable angle. The gyroscope 110 produces movement information at all times (or at predetermined time intervals) (step S1). For example, the gyroscope 110 detects the angular velocity in the direction of rotation about the longitudinal direction of the gyroscope 110. Thus, the gyroscope 110 can detect a change or changes in the Z-direction and/or Y-direction illustrated in FIG. 6, that is, a change or changes in pitch angle and/or yaw angle of the projector 100.

The determining portion 130 determines whether the movement information from the gyroscope 110 meets an adjustment condition or not (step S2). For example, in order to uncover a slight movement by the projector 100, the determining portion 130 may determine the given movement information meets an adjustment condition when the angular velocity detected by the gyroscope 110 is equal to or higher than a predetermined value.

When the movement information meets the adjustment condition, the control portion 150 performs image adjustment control. More specifically, for example, after the movement information meets the adjustment condition and when the angular velocity is lower than the predetermined value, that is, when the projector 100 substantially stops, the control portion 150 controls the image data producing portion 160 so as to produce a calibration image and controls the CCD camera 120 so as to capture the calibration image.

The image data producing portion 160 produces a calibration image on the basis of the calibration image data 142 in accordance with a control instruction from the control portion 150, and the projecting portion 190 projects the calibration image (step S3). The calibration image may be, for example, a calibration image for focus adjustment, a calibration image for distortion correction, or a calibration image for color correction.

In accordance with the control instruction from the control portion 150, the CCD camera 120 captures the calibration image projected on the screen 10 to produce a captured image, and stores it as the captured data 144 in the storage portion 140 (step S4). The control portion 150 may control the CCD camera 120 and image data producing portion 160 so that the projector 100 can repetitively produce, project and capture plural kinds of calibration image.

On the basis of the captured data 144, the control portion 150 controls the projecting portion 190 so as to perform focus adjustment and controls the image data producing portion 160 so as to perform distortion correction on the image (step S5).

After the image is adjusted, the image data producing portion 160 produces the image 20 on the basis of the image data 146, and the projecting portion 190 projects the image 20 (step S6). Even when it is determined in step S2 that the movement information does not meet the adjustment condition, the projector 100 performs the processing in step S6.

The determining portion 130 determines whether the processing is to be ended because the projector 100 is shut off, for example, or not (step S7). If the processing to be ended, the projector 100 ends the processing. If the processing is to be continued, the projector 100 continues the processing.

According to this embodiment, the projector 100 includes the gyroscope 110 that moves integrally with the CCD camera 120 and thus detects the movement of the projector 100. When the projector 100 is moved, the image adjustment control can be automatically performed. This allows a user to arrange the projector 100 at a desirable position and angle in order to cause the projector 100 to project a correct image, without requiring any button operation, for example.

According to this embodiment, the projector 100 determines whether given movement information meets an adjustment condition or not. This allows ignoring slight movements of the projector 100, and the projector 100 can thus accurately determine whether the projector 100 has been moved or not. Particularly, even when the projector 100 internally contains a speaker, for example, the projector 100 may not be required to start the image adjustment processing on the basis of the vibrations caused by the speaker in the projector 100. Thus, the projector 100 can correctly start the image adjustment processing.

According to this embodiment, the projector 100 uses the captured data 144 representing the captured image when the movement stops. Thus, the captured image to be used is free from blurs, and a distortion of the image can be more accurately corrected. According to this embodiment, the projector 100 grasps a change or changes that is or are easy to occur in pitch angle and yaw angle. Thus, the projector 100 can correctly determine whether the projector 100 has been moved or not.

According to this embodiment, the CCD camera 120 has the imaging plane in the direction for capturing a projected image. Thus, the gyroscope 110 arranged on a plane parallel to the imaging plane can more correctly detect a movement affecting the capturing. According to this embodiment, the gyroscope 110 arranged at the angle in the direction that is not equal to the horizontal direction and vertical direction of the imaging plane of the CCD camera 120 may only be required to detect the movement in one direction to detect the movement or movements in the horizontal direction and/or vertical direction.

Thus, according to this embodiment, the projector 100 may use only one gyroscope 110 that detects an angular velocity in one direction to determine whether the projector 100 has been moved or not. This allows automatic and accurate image adjustment control at low costs.

According to this embodiment, the projector 100 can automatically perform the processing from the projection of a calibration image to the image adjustment when the projector 100 is moved in a way meeting an adjustment condition.

Second Embodiment

The movement detection sensor is not limited to the (one-axis) gyroscope 110 that detects a movement in one direction but, for example, may be a (two or more-axes) gyroscope, accelerometer or magnetic sensor that detects a movement in two or more directions. The gyroscope 110 may be mounted on a main board, without limiting to the sub-board 101.

Figure 9:
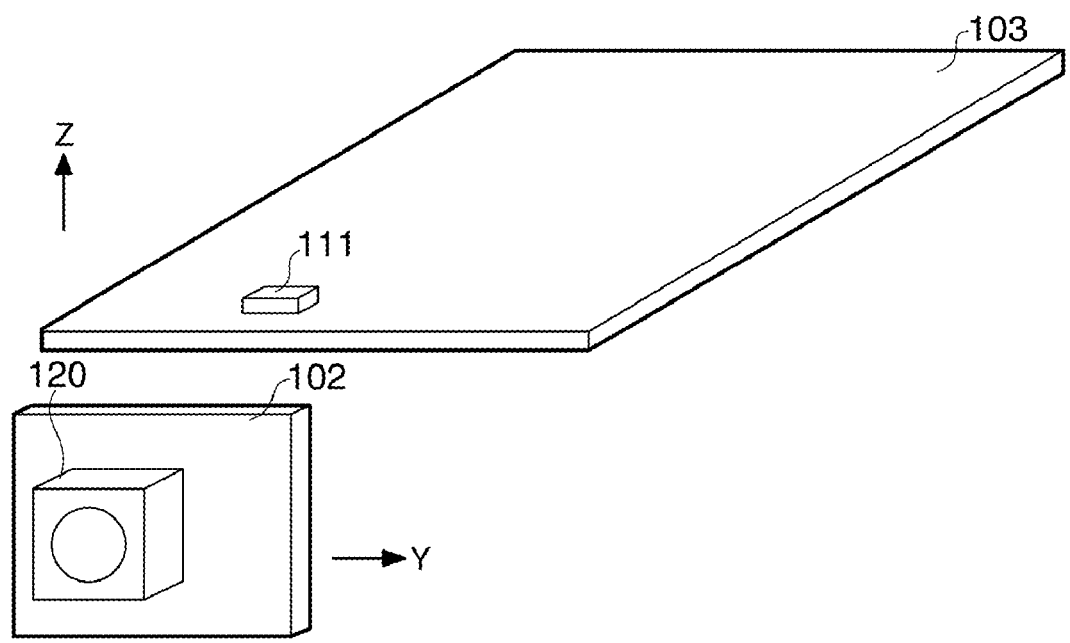
FIG. 9 illustrates external views of a main board and sub-board according to a second embodiment.

FIG. 9 illustrates external views of a main board 103 and sub-board 102 according to a second embodiment. According to the second embodiment, a gyroscope 111 that detects angular velocities in the Y-direction and Z-direction is mounted on the main board 103 within the projector 100.

The main board 103 and sub-board 102 within the projector 100 are fixed in one case, and the projector 100 is configured such that the main board 103 and sub-board 102 move integrally in accordance with the movement of the projector 100.

Also in this configuration, the projector 100 can automatically perform image distortion correction in accordance with the movement of the projector 100.

Other Embodiments

The invention is applicable to, without limiting to the aforementioned embodiments, various changes and modifications thereof. Having described according to the aforementioned embodiments, for example, the control portion 150 controls the projecting portion 190 so as to perform focus adjustment and controls the image data producing portion 160 so as to perform image distortion correction, one of them may be controlled, or color correction control may also be performed, for example.

The image sensor is not limited to the CCD camera 120 but may be a CMOS camera, for example.

The projector 100 is not limited to a (transmissive or reflective) liquid crystal projector (such as a LCOS projector) but may be a projector having a digital micromirror device, for example. The functions of the projector 100 may be distributed in a plurality of apparatus (such as a PC and a projector).

What is claimed is:

1. A projector comprising:
   a projecting portion that projects an image based on input image data;
   an image data producing portion that produces the image data and then outputs the image data to the projecting portion;
   an image sensor that captures the projected image and thus produces a captured image;
   a movement detection sensor that is arranged on a plane parallel to an imaging plane of the image sensor and produces movement information on the basis of the detected movement, the movement detection sensor being longitudinally arranged in a longitudinal direction that is different than a horizontal direction and a vertical direction of the imaging plane, the sensor being configured to determine angular velocity in a direction of rotation about the longitudinal direction of the movement detection sensor so as to determine movement in the horizontal direction and the vertical direction of the imaging plane;
   a determining portion that determines whether the movement information meets an adjustment condition or not; and
   a control portion that, when the movement information meets the adjustment condition, controls the image data producing portion so as to adjust the image data on the basis of the captured image.

2. The projector according to claim 1, wherein:
   the control portion controls the image data producing portion so as to adjust the image data in order to correct a distortion of the image on the basis of the captured image when the movement stops after the movement information meets the adjustment condition.

3. The projector according to claim 1, wherein:
   the movement detection sensor detects a change or changes in pitch angle and/or yaw angle of the imaging plane of the image sensor.

4. The projector according to claim 3, wherein:
   the movement detection sensor is a gyroscope.

5. The projector according to claim 1, wherein:
   when the movement information meets the adjustment condition, the control portion controls the image data producing portion so as to produce a calibration image data to be output to the projection portion, and controls the image sensor so as to capture the calibration image projected by the projecting portion and produce the captured image.

6. The projector according to claim 1, wherein:
   when the movement information meets the adjustment condition, the control portion controls the projecting portion so as to perform focus adjustment on the projected image on the basis of the captured image.

7. A control method for a projector,
   the projector having:
   a projecting portion that projects an image based on input image data;
   an image data producing portion that produces the image data and then outputs the image data to the projecting portion;
   an image sensor that captures the projected image and thus produces a captured image; and
   a movement detection sensor that is arranged on a plane parallel to an imaging plane of the image sensor and produces movement information on the basis of the detected movement, the movement detection sensor being longitudinally arranged in a longitudinal direction that is different than a horizontal direction and a vertical direction of the imaging plane, the sensor being configured to determine angular velocity in a direction of rotation about the longitudinal direction of the movement detection sensor so as to determine movement in the horizontal direction and the vertical direction of the imaging plane, the control method comprising:
   producing movement information on the projector;
   determining whether the movement information meets an adjustment condition or not; and
   when the movement information meets the adjustment condition, controlling the image data producing portion so as to adjust the image data on the basis of the captured image acquired by capturing a projected image.

8. A projector comprising:
   a projecting portion that projects an image based on input image data;
   an image data producing portion that produces the image data and then outputs the image data to the projecting portion;
   an image capturing device that captures the projected image;
   a one-axis gyroscope that is arranged on a plane parallel to an imaging plane of the image capturing device and produces movement information on the basis of the detected movement, the gyroscope having a longitudinal portion and being arranged in the longitudinal direction that is different than a horizontal direction and a vertical direction of the imaging plane;
   a determining portion that determines whether the movement information meets an adjustment condition or not; and
   a control portion that, if the movement information meets the adjustment condition, controls the image data producing portion so as to adjust the image data on the basis of the captured image.

\* \* \* \* \*